US007351090B1

(12) United States Patent
Moore

(10) Patent No.: US 7,351,090 B1
(45) Date of Patent: Apr. 1, 2008

(54) LATCHING MECHANISM FOR A MODULE

(75) Inventor: Joshua Moore, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/830,674

(22) Filed: Jul. 30, 2007

Related U.S. Application Data

(63) Continuation-in-part of application No. 11/738,373, filed on Apr. 20, 2007.

(60) Provisional application No. 60/868,043, filed on Nov. 30, 2006, provisional application No. 60/892,199, filed on Feb. 28, 2007, provisional application No. 60/910,793, filed on Apr. 9, 2007.

(51) Int. Cl.
*H01R 13/64* (2006.01)
(52) U.S. Cl. .................. 439/372; 439/76.1; 361/728
(58) Field of Classification Search ................ 439/372, 439/76.1, 638
See application file for complete search history.

(56) References Cited

U.S. PATENT DOCUMENTS 6,439,918 B1 * 8/2002 Togami et al. .............. 439/372
6,533,603 B1 * 3/2003 Togami ..................... 439/372
6,890,206 B2 * 5/2005 Distad et al. ............... 439/372
7,064,959 B2 * 6/2006 Kim .......................... 361/732
2004/0101257 A1 * 5/2004 Kruger et al. ................ 385/92
2005/0148223 A1 * 7/2005 Shirk et al. ................. 439/160
2006/0121769 A1 * 6/2006 Hanley et al. .............. 439/372
2006/0121794 A1 * 6/2006 Hanley et al. .............. 439/677
2006/0128221 A1 * 6/2006 Yoshikawa et al. ......... 439/607

OTHER PUBLICATIONS

Kim, Daehwan Daniel, et al., Optoelectronic Module Retention Mechanism, U.S. Appl. No. 11/738,373, filed Apr. 20, 2007.

* cited by examiner

*Primary Examiner*—Gary F. Paumen
(74) *Attorney, Agent, or Firm*—Workman Nydegger

(57) ABSTRACT

A latching mechanism for use in selectively securing a module within a receptacle of a host device. In one example embodiment, a latching mechanism includes a bail and a latch attached to the bail. The bail is configured to be attached to a shell of a module and to rotate about a first axis between a latched position and an unlatched position. The first axis is in a fixed position relative to the shell. The latch is attached to the bail at a second axis that is offset from the first axis. The latch is configured to rotate about the second axis. The second axis is movable relative to the shell.

20 Claims, 9 Drawing Sheets

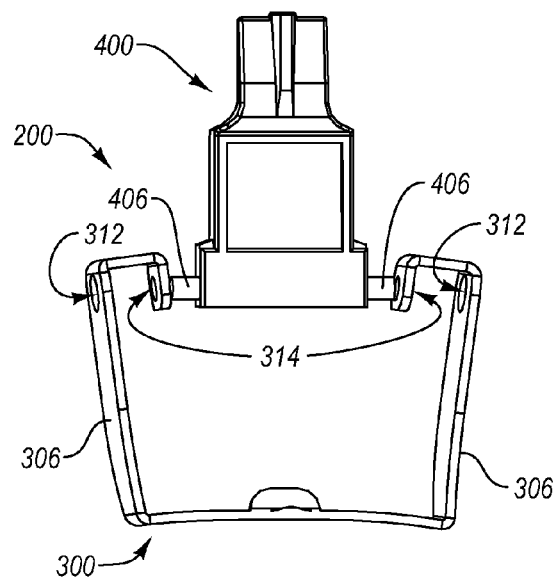
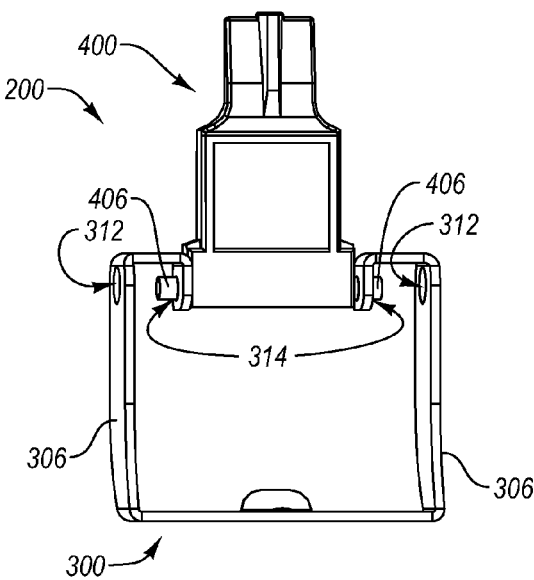
Fig. 4A  Fig. 4B
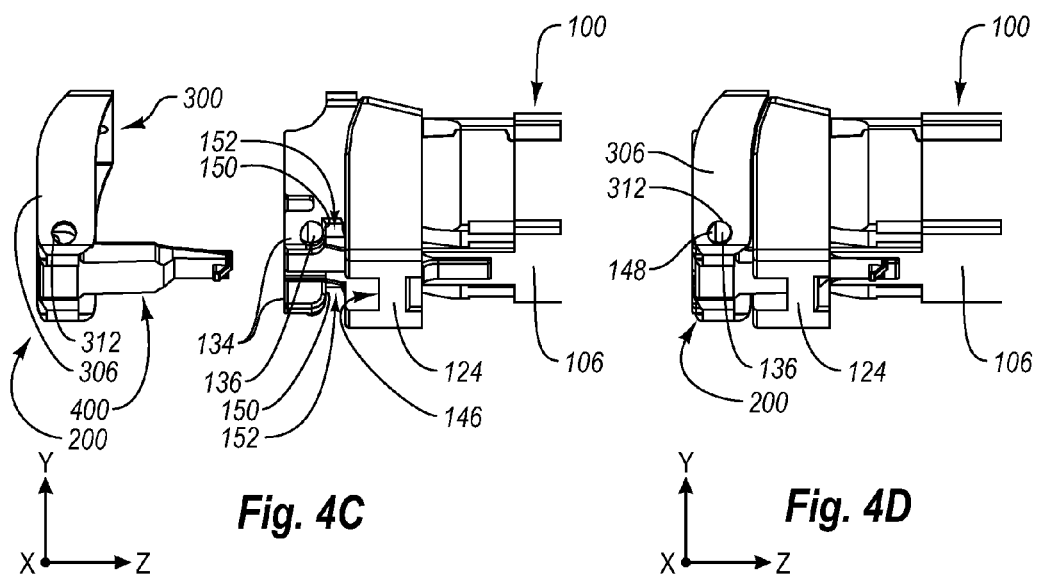
Fig. 4C  Fig. 4D

LATCHING MECHANISM FOR A MODULE

CROSS-REFERENCE TO RELATED APPLICATIONS

This application claims priority to U.S. Provisional Patent Application Ser. No. 60/868,043, filed on Nov. 30, 2006, U.S. Provisional Patent Application Ser. No. 60/892,199, filed on Feb. 28, 2007, and U.S. Provisional Patent Application Ser. No. 60/910,793, filed on Apr. 9, 2007. This application is also a continuation-in-part of U.S. patent application Ser. No. 11/738,373, filed on Apr. 20, 2007, which claims priority to U.S. Provisional Patent Application Ser. No. 60/910,793, filed on Apr. 9, 2007. Each of the aforementioned applications is incorporated herein by reference in its entirety.

BACKGROUND

Modules, such as electronic or optoelectronic transceiver or transponder modules, are increasingly used in electronic and optoelectronic communication. Some modules are pluggable, which permits the module to be inserted and removed from a receptacle of a host device, such as a host computer, switching hub, network router, or switch box. Some host devices include multiple receptacles and can therefore accommodate multiple modules simultaneously. Each module typically communicates with a printed circuit board of the host device by transmitting and/or receiving electrical signals to and/or from the host device printed circuit board. These electrical signals can also be transmitted by the module outside the host device as optical and/or electrical signals.

In order for a module to be pluggable, various latching mechanisms have been developed to secure modules within host device receptacles and to release modules from within host device receptacles. One such latching mechanism requires the use of a separate extraction tool to retrieve a module from a host device receptacle. Use of a separate extraction tool can be undesirable because an extraction tool can raise costs, can be misplaced, and may not be compatible with other module designs and/or mechanism designs.

Other latching mechanisms require that the leading edge of the receptacle of a host device be flexible in order to enable the corresponding module to be inserted into and/or extracted from the receptacle. These mechanisms can be undesirable because a receptacle with a flexible leading edge can sometimes allow an undesirable amount of electromagnetic radiation to be unintentionally emitted from the receptacle, which can cause electromagnetic interference in surrounding electronic devices.

SUMMARY OF SOME EXAMPLE EMBODIMENTS

In general, example embodiments of the invention relate to a latching mechanism for use in selectively securing a module within a receptacle of a host device. The example latching mechanisms disclosed herein enable module insertion and removal while providing a handle capable of withstanding relatively high pull forces. The example latching mechanisms also include features that assist both the selective retention of the module within a receptacle of a host device and removal therefrom when desired. Moreover, in one example embodiment, the latching mechanism is configured so as to retract its engagement pin while a bail of the latching mechanism is still in the latched position so as to prevent malfunction as the module is inserted into a receptacle with a substantially rigid leading edge.

In one example embodiment, a latching mechanism includes a bail and a latch attached to the bail. The bail is configured to be attached to a shell of a module and to rotate about a first axis between a latched position and an unlatched position. The first axis is in a fixed position relative to the shell. The latch is attached to the bail at a second axis that is offset from the first axis. The latch is configured to rotate about the second axis. The second axis is movable relative to the shell.

In another example embodiment, a module includes a shell including a cross bar, a PCB at least partially positioned within the shell, a TOSA and a ROSA both electrically coupled to the PCB, and a latching mechanism. The latching mechanism includes a bail and a latch attached to the bail. The bail is attached to the shell and is configured to rotate about a first axis between a latched position and an unlatched position, with the first axis being in a fixed position relative to the shell. The latch is attached to the bail at a second axis that is offset from the first axis. The latch is configured to rotate about the second axis with the second axis being movable relative to the shell.

In yet another example embodiment, a module includes a shell including a cross bar, a PCB at least partially positioned within the shell, a TOSA and a ROSA both electrically coupled to the PCB, and a latching mechanism. The latching mechanism includes a bail, a latch attached to the bail, and a spring attached to the latch. The bail is attached to the shell and is configured to rotate about a first axis between a latched position and an unlatched position, with the first axis being in a fixed position relative to the shell. The latch is attached to the bail at a second axis that is offset from the first axis. The latch is configured to rotate about the second axis with the second axis being movable relative to the shell. The spring is configured to engage a corresponding surface of the shell such that a pin of the latch is biased to extend from the shell when the bail is in the latched position. The spring also configured to allow the pin to be resiliently retained within the shell when the bail is in the latched position.

These and other aspects of example embodiments of the invention will become more fully apparent from the following description and appended claims.

BRIEF DESCRIPTION OF THE DRAWINGS

To further clarify the above and other aspects of example embodiments of the invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments of the invention, and are not limiting of the invention nor are they necessarily drawn to scale. Example embodiments of the invention will be disclosed and explained with additional specificity and detail through the use of the accompanying drawings in which:

FIGS. 4A-4D are various views of portions of the module of FIG. 1A;

DETAILED DESCRIPTION OF SOME EXAMPLE EMBODIMENTS

Example embodiments of the invention relate to a latching mechanism for use in selectively securing a module within a receptacle of a host device. The example latching mechanisms disclosed herein enable module insertion and removal while providing a handle capable of withstanding relatively high pull forces. The example latching mechanisms also include features that assist both the selective retention of the module within a receptacle of a host device and removal therefrom when desired. Moreover, in one example embodiment, the latching mechanism is configured so as to retract its engagement pin while a bail of the latching mechanism is still in the latched position so as to prevent malfunction as the module is inserted into a receptacle with a substantially rigid leading edge.

1. Example Module

Figure 1A:
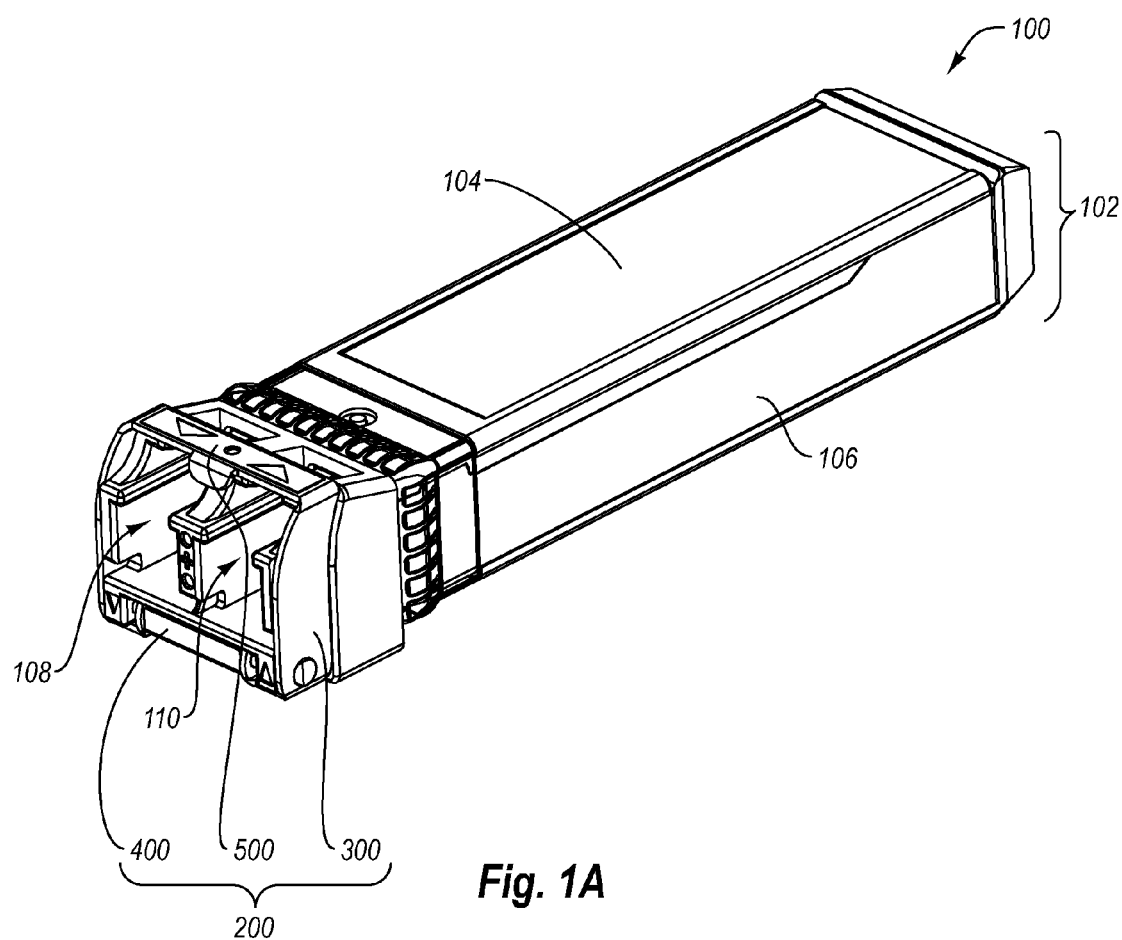
FIG. 1A is a front perspective view of an example module including an example latching mechanism.
Figure 1B:
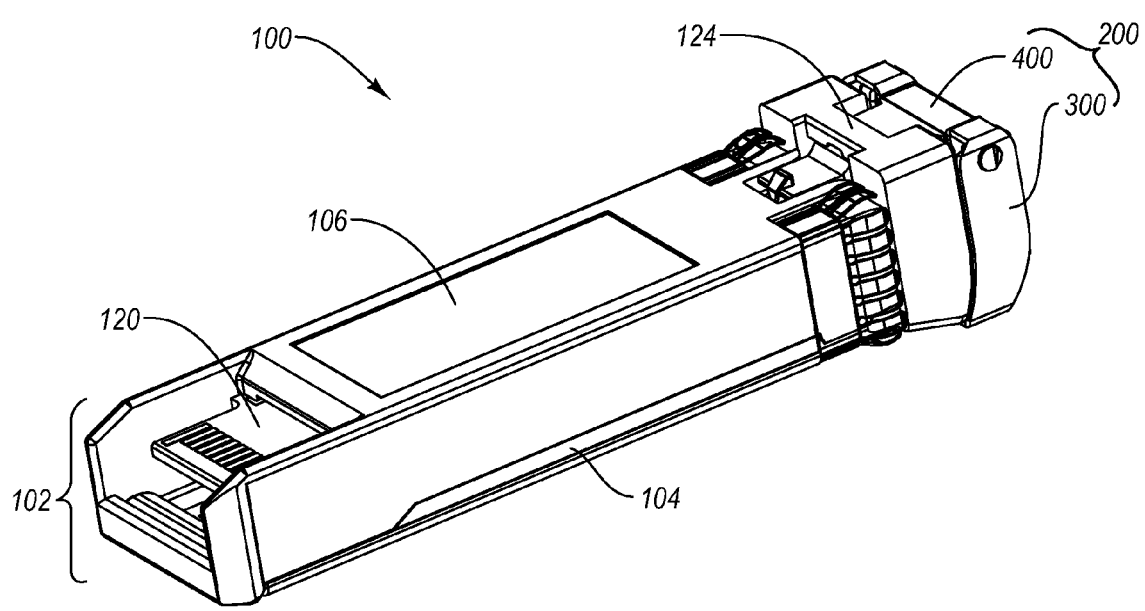
FIG. 1B is an upside-down rear perspective view of the example module of FIG. 1A.
Figure 1C:
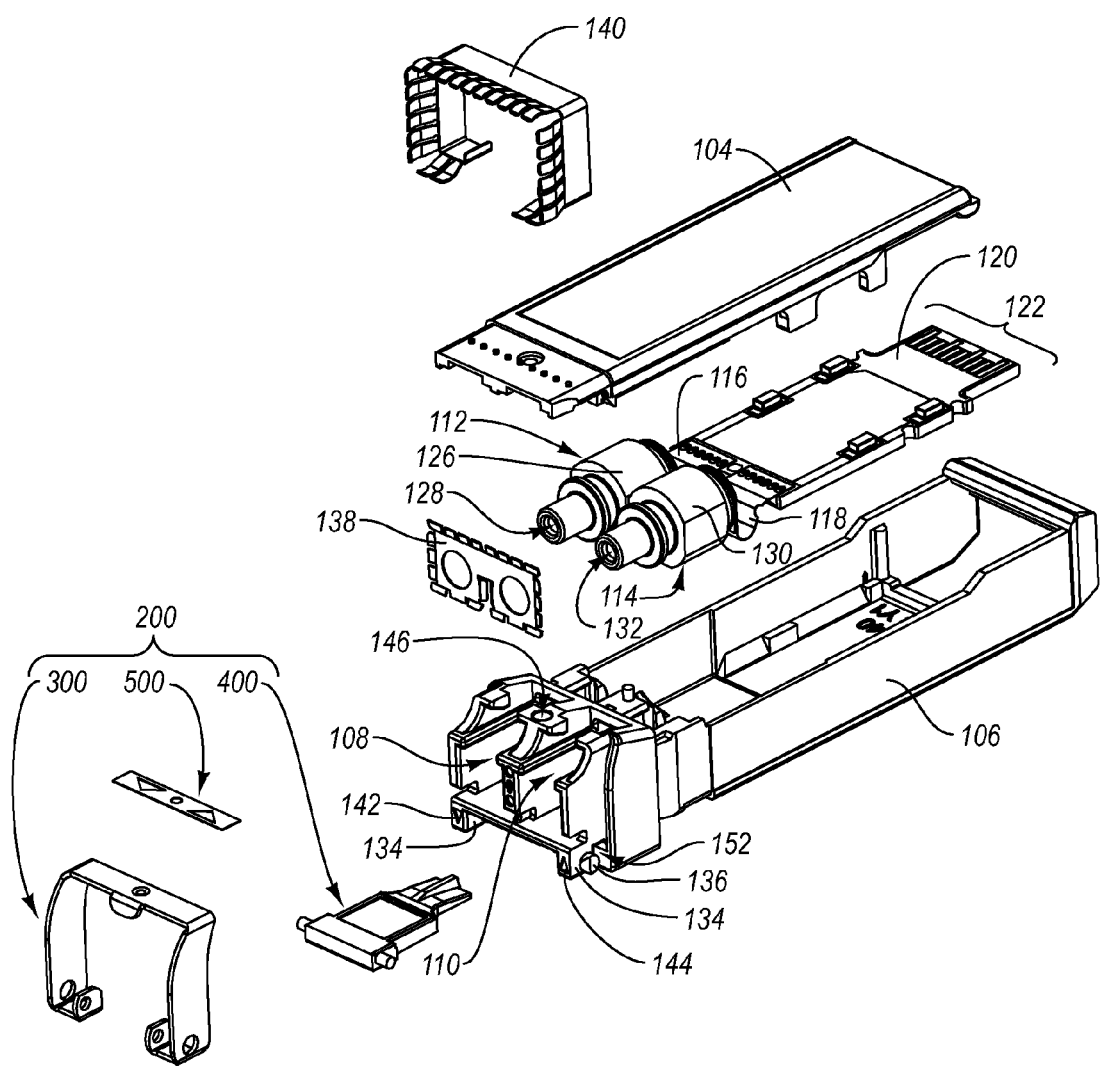
FIG. 1C is an exploded view of the example module of FIG. 1A.

Reference is first made to FIGS. 1A-1C which disclose an example module 100 for use in transmitting/receiving optical signals that are converted from/to electrical signals that are transmitted to/received from a host device (not shown). As disclosed in FIGS. 1A and 1B, the module 100 includes various components, including a shell 102 that includes a top shell 104 and a bottom shell 106, and an output port 108 and an input port 110 defined in the bottom shell 106. The top shell 104 and the bottom shell 106 can be formed using a die casting process. One example material from which the top shell 104 and the bottom shell 106 can be die cast is zinc, although the top shell 104 and the bottom shell 106 may alternatively be die cast, injection molded, machined, or otherwise manufactured from other suitable materials.

As disclosed in FIGS. 1B and/or 1C, the example module 100 also includes a transmitter optical subassembly ("TOSA") 112, a receiver optical subassembly ("ROSA") 114, electrical interfaces 116 and 118, and a printed circuit board ("PCB") 120 having an edge connector 122. The two electrical interfaces 116 and 118 are used to electrically connect the TOSA 112 and the ROSA 114, respectively, to the PCB 120. The bottom shell 106 also includes a cross bar 124 which will be discussed in further detail below in connection with FIGS. 4A-6B.

The TOSA 112 of the module 100 includes a barrel 126 within which an optical transmitter, such as a laser, (not shown) is positioned. The optical transmitter is configured to convert electrical signals received through the PCB 120 from a host device (not shown) into corresponding optical signals. The TOSA 112 also includes a port 128. The port 128 is configured to optically connect the optical transmitter positioned within the barrel 126 with a fiber-ferrule (not shown) positioned within the output port 108.

Similarly, the ROSA 114 of the module 100 includes a barrel 130 and a port 132. The port 132 is configured to optically connect an optical receiver, such as a photodiode (not shown), positioned within the barrel 130 to a fiber-ferrule (not shown) positioned within the input port 110. The optical receiver is configured to convert optical signals received from the fiber-ferrule into corresponding electrical signals for transmission to a host device (not shown) through the PCB 120.

The module 100 further includes a pair of tabs 134, a pair of posts 136, an example optical sub-assembly ("OSA") positioning plate 138, and an example collar clip 140. The tabs 134 can include data direction indicators 142 and 144 that correspond to the data directions of the TOSA 112 and the ROSA 114, respectively. Specifically, the data direction indicator 142 specifies that the TOSA 112 transmits data out of the output port 108 and the data direction indicator 144 specifies that the ROSA 114 receives data through the input port 110. The example OSA positioning plate 138 can help secure the TOSA 112 and the ROSA 114 in an accurate x, y, and z optical alignment with the output port 108 and the input port 110, respectively. In addition, the OSA positioning plate 138 can help solve problems associated with gaps that result from manufacturing tolerances of the top shell 104, the bottom shell 106, the TOSA 112, and the ROSA 114. The example collar clip 140 can secure the top shell 104 to the bottom shell 106 and thus eliminate the need for a screw or other fastener(s) to attach the top shell 104 and the bottom shell 106 together. In addition, the example collar clip 140 can simultaneously perform an EMI containment function in conjunction with a receptacle of a host device (not shown) when the module 100 is plugged into the receptacle of the host device.

The module 100 can be configured for optical signal transmission and reception at a variety of per-second data rates including, but not limited to, 1 Gbit, 2 Gbit, 2.5 Gbit, 4 Gbit, 8 Gbit, 10 Gbit, or higher. Furthermore, the module 100 can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Further, the module 100 can be configured to support various transmission standards including, but not limited to, Fast Ethernet, Gigabit Ethernet, 10 Gigabit Ethernet, and 1x, 2x, 4x, and 10x Fibre Channel.

In addition, although one example of the module 100 is configured to have a form factor that is substantially compliant with the SFP+ (IPF) MSA, the module 100 can alternatively be configured to have a variety of different form factors that are substantially compliant with other MSAs including, but not limited to, the SFF MSA or the SFP MSA. Also, although the example module 100 is configured as an optoelectronic transceiver module, the example latching mechanisms disclosed herein can also benefit other modules such as optoelectronic transponder modules or electronic transceiver or transponder modules.

2. Example Latching Mechanism

With continued reference to FIGS. 1A-1C, the module 100 also includes an example latching mechanism 200. The example latching mechanism 200 generally includes a bail 300 and a latch 400 configured to cooperate with each other in releasably securing the optoelectronic transceiver module 100 within a receptacle, such as a cage, of a host device (not shown). The bail 300 may also include a visible indicator that provides information concerning a characteristic of the module 100. One example of such a visible indicator is a decal 500, aspects of which will be discussed in greater detail below in connection with FIGS. 2A and 2B.

Figure 2A:
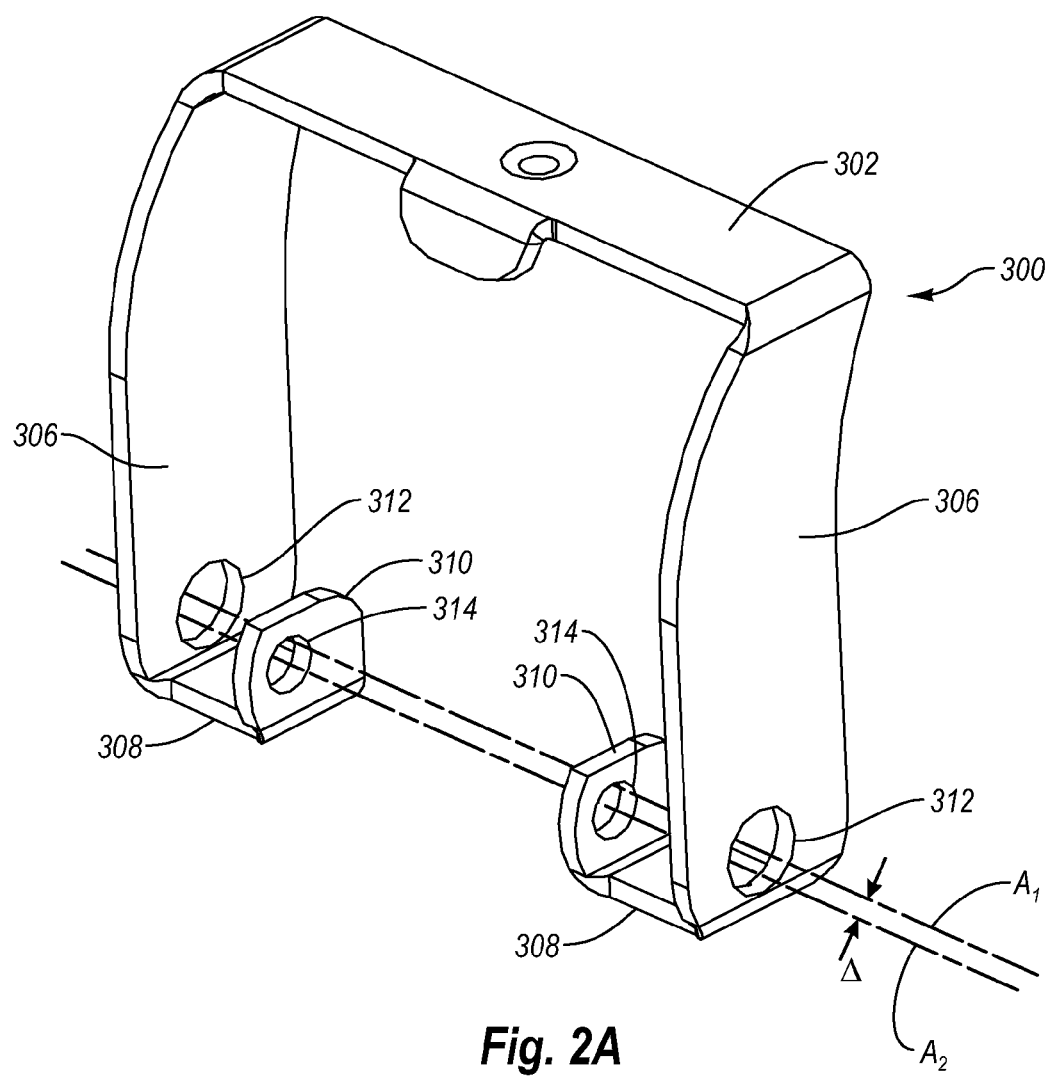
FIG. 2A is a front exploded view of an example handle of the example latching mechanism of FIGS. 1A-1C.
Figure 2B:
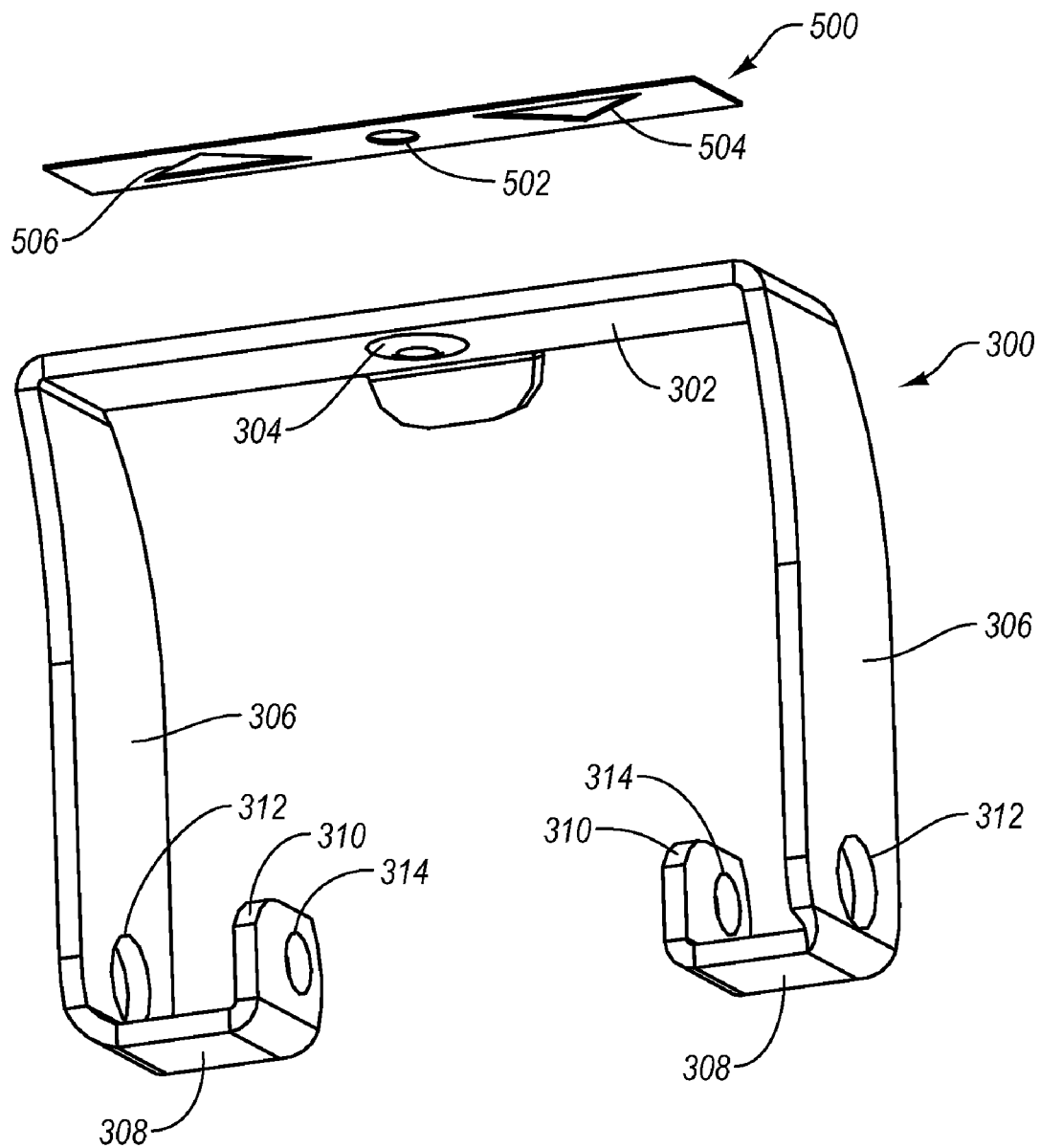
FIG. 2B is a rear exploded view of the example handle of FIG. 2A.

With continued reference to FIG. 1C, and with reference now also to FIGS. 2A and 2B, additional aspects of the bail 300 are disclosed. In one embodiment, the bail 300 is composed of sheet metal, though other suitable materials can also be used. The bail 300 includes a handle 302 that can be grasped by a user in order to reposition the bail 300 and in order to remove the module 100 from a receptacle of a host device (not shown). The bail 300 also includes a downward-extending protrusion 304 (FIG. 2B) defined in the handle 302, a pair of arms 306 connected to the handle 302, a pair of bases 308 connected to the arms 306, respectively, and a pair of fingers 310 connected to the bases 308, respectively.

Each of the arms 306 also includes a shell post hole 312, and each of the fingers 310 includes a latch post hole 314. As disclosed in FIG. 2A, the two shell post holes 312 define a first axis $A_1$ and the latch post holes 314 define a second axis $A_2$. However, the two shell post holes 312 are offset with respect to the latch post holes 314. In detail, the axis $A_1$ defined by the two shell post holes 312 and the axis $A_2$ defined by the two latch post holes 314 are offset a distance $\Delta$ from each other.

As disclosed in FIG. 2B, the protrusion 304 extends downward from the underside of the handle 302 of the bail 300. As disclosed in FIG. 1C, the bottom shell 106 includes a recess 146 that generally corresponds in size and location to the protrusion 304. Once the bail 300 is attached to the bottom shell 106 such that the posts 136 extend through the shell post holes 312, the bail 300 can be rotated about the axis $A_1$ with a travel distance of approximately 90 degrees in this example. The protrusion 302 is positioned to interfere with the bottom shell 106. However, the bail 300 is configured to flex slightly so that the interference between the protrusion 302 and the bottom shell 106 can to be overcome when the bail 300 is rotated about the axis $A_1$ from an unlatched position into a latched position. As used herein, the term "latched position" refers to a position of the bail 300 that results in a latch pin (see, for example, the latch pin 408 of FIG. 3B) of the latch 400 extending out of the bottom shell 106 of the module 100 and engaging a corresponding structure of a host device, such as a recess defined in the floor of a host receptacle for example, as disclosed in FIG. 5A. As used herein, the term "unlatched position" refers to a position of the bail 300 that results in a latch pin of the latch 400 retracted within a cavity defined in the bottom shell 106 of the module 100 such that the latch pin does not engage a corresponding structure of a host device, such as a recess defined in the floor of a host receptacle for example, as disclosed in FIG. 5B.

In particular, as the bail 300 is rotated into the latched position, the protrusion 304 can releasably engage the recess 146 by seating in the recess 146, thereby releasably securing the bail 300 in the latched position. The protrusion 304 and the recess 146 can thus provide tactile feedback to a user as the protrusion 304 seats in the recess 146. This securement of the bail 300 in the latched position can avoid the inadvertent release of the bail 300 from the latched position. In addition, a user can apply a deliberate force to the bail 300 to disengage the protrusion 304 from the recess 146 in order to release of the bail 300 from the latched position.

It is noted that the size, location, number, and shape of the protrusion 304 and/or the recess 146 disclosed in FIGS. 1C and 2B can vary in alternative embodiments. For example, the size of the protrusion 304 and/or the recess 146 can be increased or decreased. In addition, the protrusion 304 and the recess 146 can be located anywhere along the top or sides of the bail 300 and the bottom shell 106, respectively. Further, multiple protrusion/recess pairs can be included in the bail 300 and the bottom shell 106. Also, the shape of the protrusion 304 and the recess 146 need not be substantially circular as disclosed in FIGS. 1C and 2A, but could instead be any other suitable shape, such as an elongated bar shape for example. Finally, the respective locations of the protrusion(s) 304 and the recess(es) 146 can be reversed, with the protrusion 304 being defined in the bottom shell 106 and the recess 146 being defined in the bail 300.

The example bail 300 may further include one or more visible indicators that provide information concerning a characteristic of the module 100. The visible indicators of the bail 300 can include, for example, color-coded portions, raised or depressed characters, printed characters, or any other visible indicator that can serve to identify characteristics of the module 100. The term "characters" as defined herein refers to letters, numbers, punctuation, any other symbol, and any combination thereof. The characteristics of the module 100 that can be identified by the visible indicators of the bail 300 can include, but are not limited to, the data rate, wavelength, communication protocol, form factor, manufacturer, or vendor of the module 100.

In one example embodiment, a single visible indicator of the bail 300 can serve to identify a single characteristic of the module 100. For example, a single color-coded portion of the bail 300 can identify a wavelength of the module 100. In another example embodiment, a single visible indicator of the bail 300 can serve to identify multiple characteristics of the module 100. For example, a single color-coded portion of the bail 300 can indicate both the wavelength as well as the form factor of the module 100. In yet another example embodiment, the bail 300 can include multiple visible indicators that each serve to identify one or more characteristics of the module 100. For example, a color-coded portion of the bail 300 can identify a wavelength of the module 100 while raised characters formed on a surface of the bail 300 can identify a data rate of the module 100.

In one example embodiment, the bail 300 can include the decal 500 adhered to the handle 302 of the bail 300. The decal 500 can be formed from, or coated with, a colored material according to the wavelength of the module 100. For example, the decal 500 can be colored as follows: 1270 nm, Light purple; 1290 nm, Sky blue; 1310 nm, Yellow Green; 1330 nm, Yellow Ocher; 1350 nm, Pink; 1370 nm, Beige; 1390 nm, White; 1410 nm, Silver; 1430 nm, Black; 1450 nm, Yellow Orange; 1470 nm, Gray; 1490 nm, Violet; 1510 nm, Blue; 1530 nm, Green; 1550 nm, Yellow; 1570 nm, Orange; 1590 nm, Red; and 1610 nm, Brown.

In addition, the decal 500 can include an opening 502 corresponding to the protrusion 304 of the bail 300, and data direction indicators 504 and 506 that correspond to the data directions of the TOSA 112 and the ROSA 114, respectively. Specifically, the data direction indicator 504 specifies that the TOSA 112 transmits data out of the output port 108 and the data direction indicator 506 specifies that the ROSA 114 receives data through the input port 110. In another example embodiment, the data direction indicators 504 and 506 can be included on other portions of the module 100 or the latching mechanism 200. For example, the data direction indicators 504 and 506 can be included on a visible surface of the latch 400 (see FIG. 6A) or on a visible surface of the bail 300. For example, the data direction indicators 504 and 506 can be inscribed, embossed, painted, and/or anodized directly on the handle 302 of the bail 300.

Figure 3A:
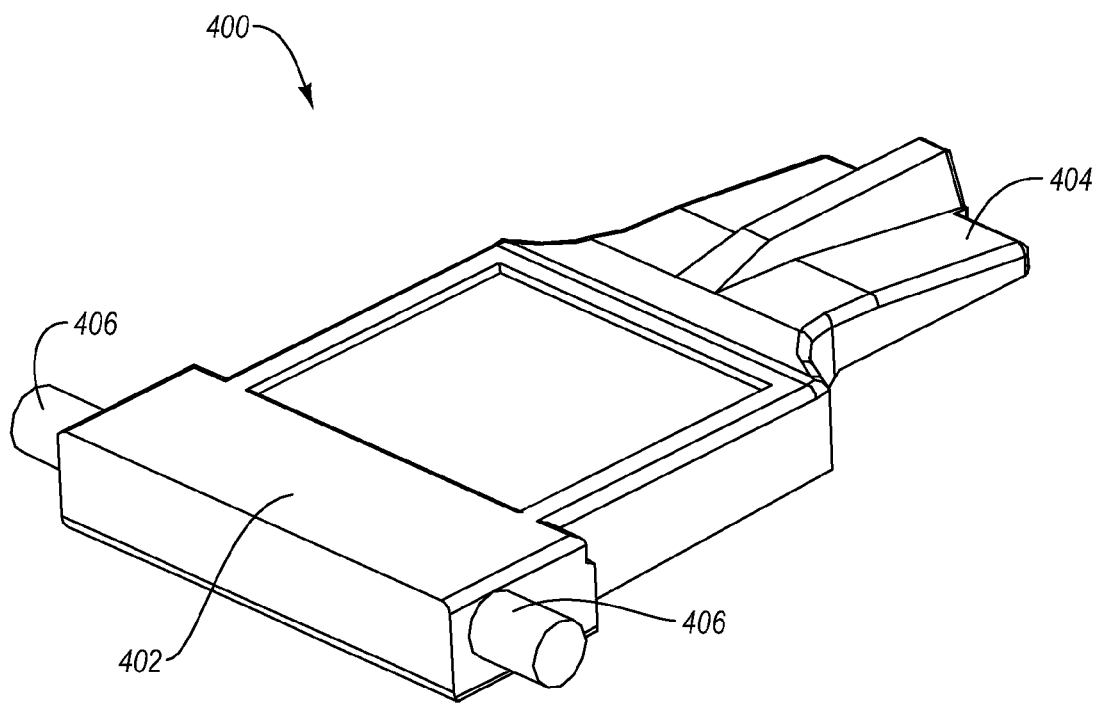
FIG. 3A is a front perspective view of an example latch of the example latching mechanism of FIGS. 1A-1C.
Figure 3B:
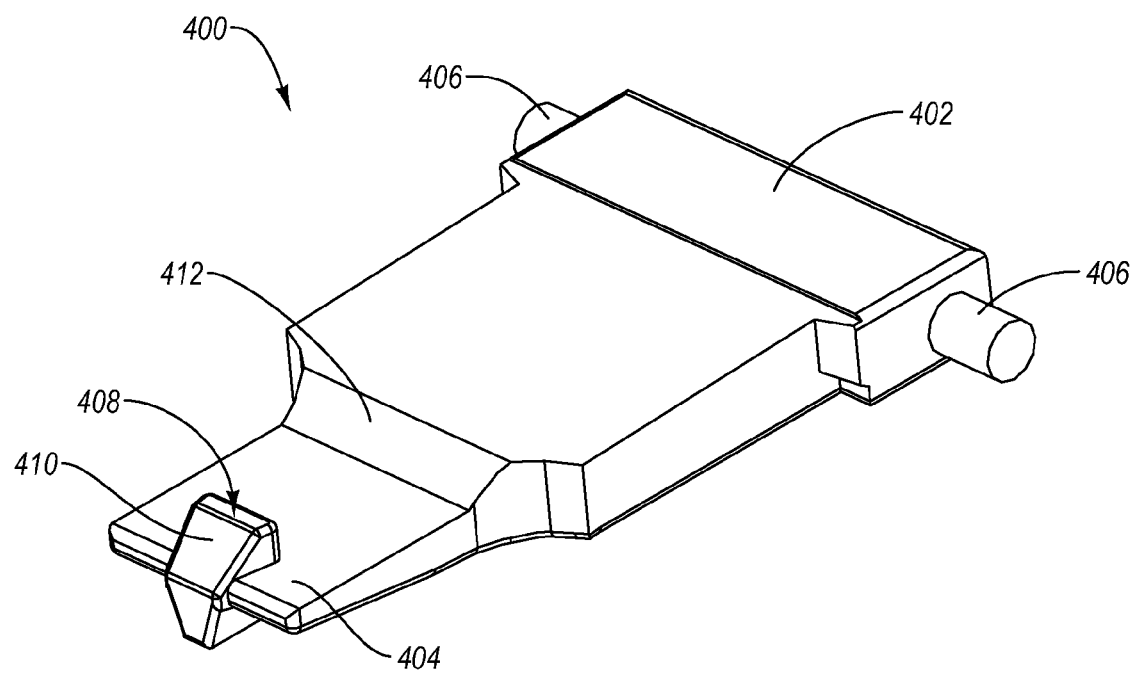
FIG. 3B is an upside-down rear perspective view of the example latch of FIG. 3A.

With continued reference to FIGS. 1C, 2A, and 2B, and with reference now also to FIGS. 3A and 3B, details of the example latch 400 will be disclosed. The example latch 400 can be composed in one embodiment of a zinc cast material, but in other embodiments, any suitable material can be employed including, but not limited to, thermoplastics, machined aluminum, other machined materials, or sheet metal. The latch 400 includes a first end 402 and a second end 404. Two oppositely extending latch posts 406 are included on the first end 402 of the latch 400, and a latch pin 408 is included on the second end 404 of the latch 400. As discussed in further detail below, the latch pin 408 is configured to selectively engage with a corresponding structure defined in a receptacle (not shown) of a host device. As disclosed in FIG. 3B, the latch pin 408 includes a wedge surface 410. When the bail 300 is positioned in the latched position, the wedge surface 410 is configured and arranged to make contact with a leading edge of a receptacle during the insertion of the module 100 into the receptacle. The latch 400 also includes a knuckle 412. When the module 100 is positioned in a receptacle of a host device, the knuckle 412 can be configured and arranged to push against a leading edge of the receptacle as the bail 300 is moved from a latched position to a unlatched position, as disclosed in greater detail below in connection with FIG. 5B.

With reference now to FIGS. 4A-4D, and with reference as well to FIGS. 2A and 2B, details of an example process of assembling the latching mechanism 200 are disclosed. As disclosed in FIG. 4A, the arms 306 of the bail 300 can be flexed outward to allow the latch post holes 314 of the bail 300 to be aligned with the posts 406 of the latch 400. As disclosed in FIG. 4B, the arms 306 can then be released and the bail 300 can be allowed to regain its natural shape such that the posts 406 are inserted into, and maintained in, respective latch post holes 314. As disclosed in FIGS. 4C and 1B, the latch 400 of the latch assembly 200 can then be inserted into a cavity 146 defined by the cross-bar 124 and the bottom shell 106. So positioned, the crossbar 124 helps retain the latch 400 in the cavity 146.

As the latch 400 is inserted into the cavity 146, arms 306 of the bail 300 are configured and arranged to slide along wedge portions 148 of the posts 136. As the latch 400 is inserted into the cavity 146, sliding along the wedge portions 148 of the posts 136 causes the arms 306 of the bail 300 to be flexed outward in order for the arms 306 to slide past the posts 136 until the posts 136 are seated in respective shell post holes 312, as disclosed in FIG. 4D. Also disclosed in FIG. 4C are back surfaces 150 of the tabs 134 as well as notches 152, additional aspects of which will be disclosed herein in connection with FIG. 5A.

Figure 5A:
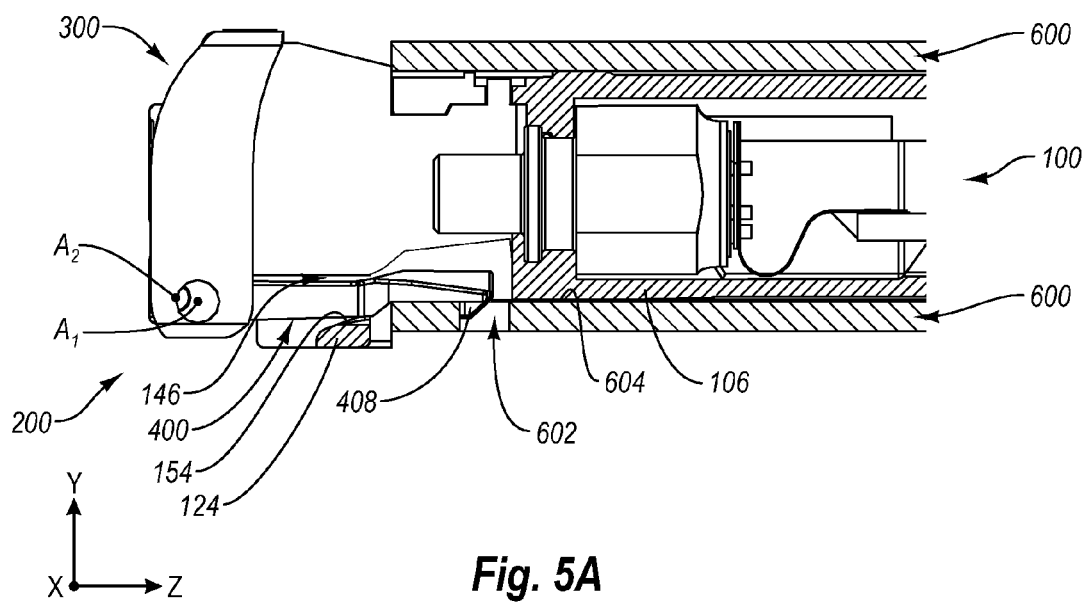
FIG. 5A is a cross-sectional side view of the module of FIG. 1A showing the module plugged into an example host device receptacle with the latching mechanism in a latched position.
Figure 5B:
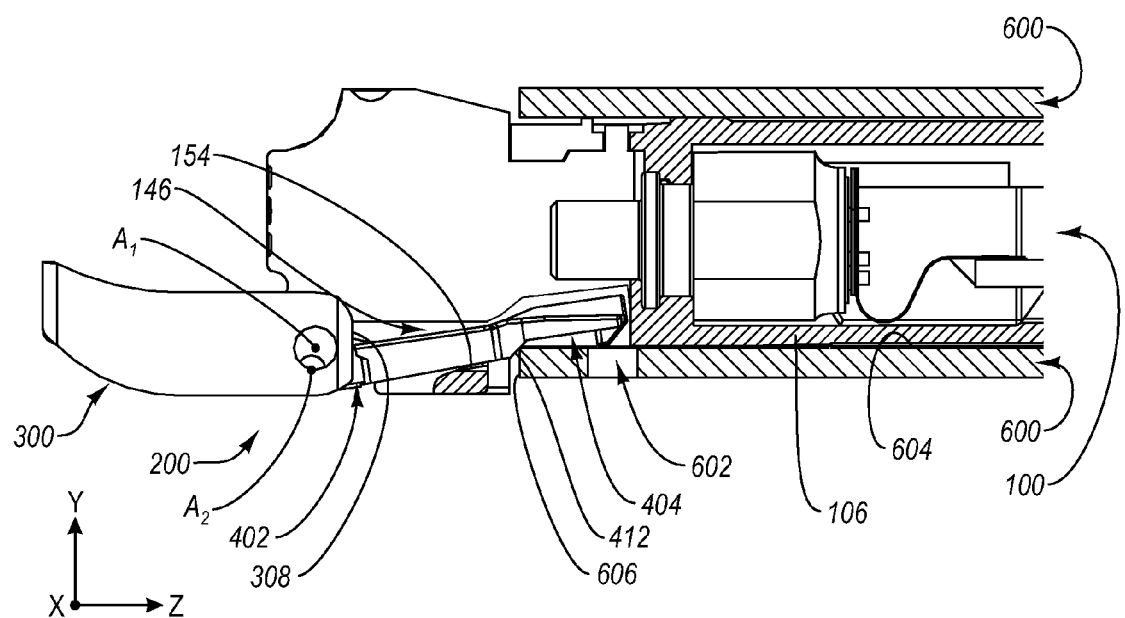
FIG. 5B is a cross-sectional side view of the example module and the example host device receptacle of FIG. 5A with the latching mechanism in an unlatched position.

Turning now to FIGS. 5A and 5B, aspects of the operation of the example latching mechanism 200 are disclosed. As disclosed in FIG. 5A, when the bail 300 is positioned in the latched position and the module 100 is positioned within a receptacle 600 of a host device (not shown), the latch pin 408 extends out of the bottom shell 106 of the module 100 and engages a recess 602 defined in the floor 604 of the receptacle 600. In this way, the module 100 is removably secured within the receptacle 600.

As disclosed in FIG. 5A, the rotational axis $A_1$ of the bail 300 is slightly lower in the y-position than the rotational axis $A_2$ of the latch 400 when the bail 300 is positioned in the latched position. This arrangement ensures that if substantial force is applied to the latch pin 408 in the direction of the z-arrow in FIG. 5A (hereinafter the "positive z-direction"), the latch 400 and the bail 300 will unsuccessfully attempt to rotate in a clockwise direction such that the latch pin 408 will not inadvertently unlatch from the recess 602 of the receptacle 600. In this position, the latch 400 also rests upon a surface 154 of the crossbar 124 defined by the bottom shell 106. In one example embodiment, when the bail 300 is positioned in the latched position, a small amount of pulling force exerted by the latch pin 408 in the opposite direction of the z-arrow in FIG. 5A (hereinafter the "negative z-direction") against the recess 602 causes the module 100 to remain securely positioned within the receptacle 600.

As disclosed in FIG. 5B, when the bail 300 is rotated about the axis $A_1$ to an unlatched position, this rotation causes a corresponding rotation of the latch 400 about the axis $A_2$. As disclosed in the cross-sectional side view of FIG. 5B, however, because the axis $A_1$ and the axis $A_2$ are offset from one another, the axis $A_2$ moves in relation to the axis $A_1$ such that the axis $A_2$ is rotated counterclockwise to a y-position that is offset from the y-position of the axis $A_1$. As disclosed in FIG. 5B, the axis $A_1$ of bail 300 and the axis $A_2$ of the latch 400 have substantially the same z-position when the bail 300 is positioned in the unlatched position. In addition, as the first end 402 of the latch 400 is lowered by the counterclockwise rotation of the axis $A_2$, the second end 404 of the latch 400 is retracted within the bottom shell 106 of the module 100. At the same time, the rotation of the bail 300 from the latched position to the unlatched position causes the latch 400 to slide backward a small distance (in the direction of the z-arrow in FIG. 5A—hereinafter the "positive z-direction") along the surface 154 of the crossbar 124. The retraction of the second end 404 of the latch 400 within the bottom shell 106 causes the latch pin 408 to retract within the bottom shell 106, and thereby disengage from the recess 602 of the receptacle 600. The offset axes $A_1$ and $A_2$ therefore enable the rotational movement of the bail 300 to be converted into a translational movement of the second end 404 of the latch 400 in the positive y-direction and the positive z-direction.

The backward movement of the latch 400, together with the lowering of the first end 402 of the latch 400, causes the knuckle 412 to extend from cavity 146, as disclosed in FIG. 5B. In one example embodiment, as the knuckle 412 extends from the cavity 146 proximate a leading edge 606 of the receptacle 600, the extension of the knuckle 412 assists in pushing the module 100 out of the receptacle 600, thereby facilitating removal of the module 100 from the receptacle 600.

Once disengaged in this way, the module 100 can then be pulled from the receptacle 600. In one example embodiment, when the bail 300 is positioned in the unlatched position disclosed in FIG. 5B, the bail 300 is positioned such that the bases 308 of the bail 300 are positioned in respective notches 152 adjacent to the rear surfaces 150 of the shell tabs 134 (see FIGS. 4C and 1C). This position enables the bail 300 to pull against not only against the shell posts 136 but also against the rear surfaces 150 of the shell tabs 134. The additional structural support provided by the shell tabs 134 results in the ability of the module 100 to withstand a relatively greater pull force than where the shell tabs 134 are not present. In one embodiment, a pull force of approximately 50 pounds can be achieved. The ability to withstand a relatively greater pull force is desirable because this ability allows the module 100 to be removed from a receptacle quickly with little or no risk of damaging the handle 300 or the module 100.

Thus, the example latching mechanism 200 can be used to selectively secure the module 100 within the receptacle 600 of a host device (not shown). The example latching mechanism 200 disclosed herein enables module insertion and removal while providing a handle 300 capable of withstanding relatively high pull forces. The example latching mechanism 200 can also assist in pushing the module 100 out of the receptacle 600, thereby facilitating removal of the module 100 from the receptacle 600.

3. Another Example Latching Mechanism

Figure 6A:
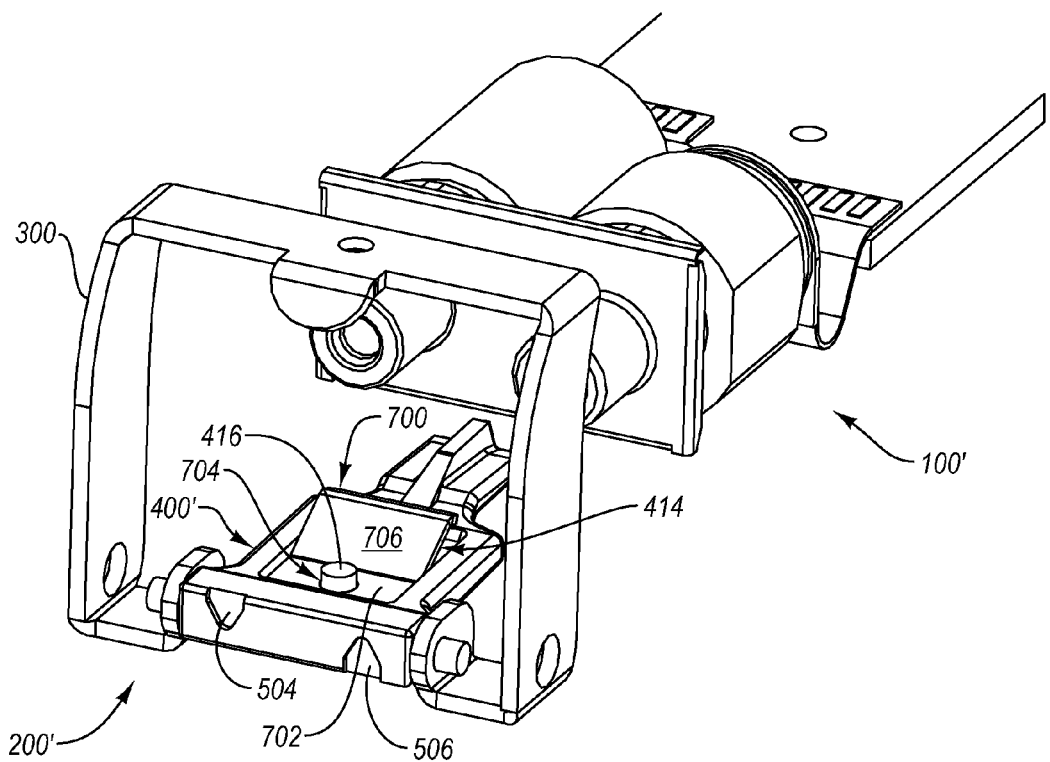
FIG. 6A is a partial perspective view of another example module including another example latching mechanism.
Figure 6B:
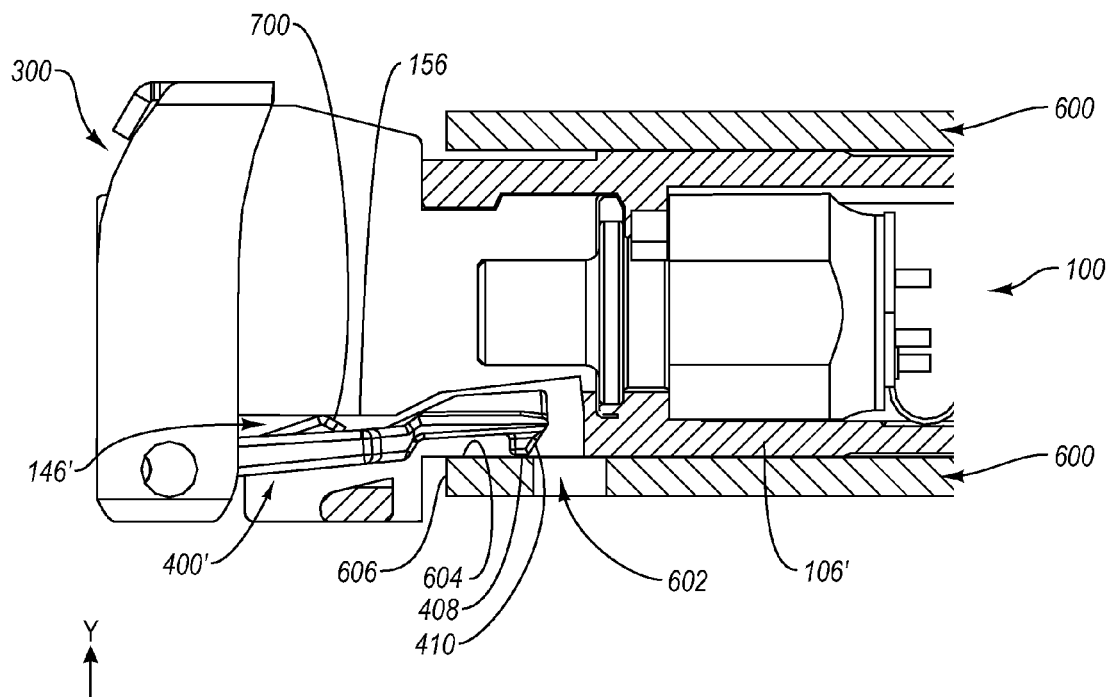
FIG. 6B is a cross-sectional side view of the module and the example latching mechanism of FIG. 6A showing the module plugged into an example host device receptacle with the handle of the latching mechanism in a latched position and the latch of the latching mechanism in a resiliently retained position.
Figure 5B:
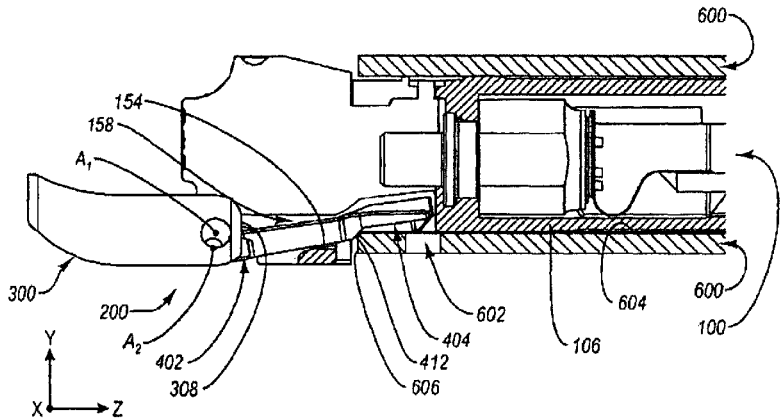
Figure 6B:
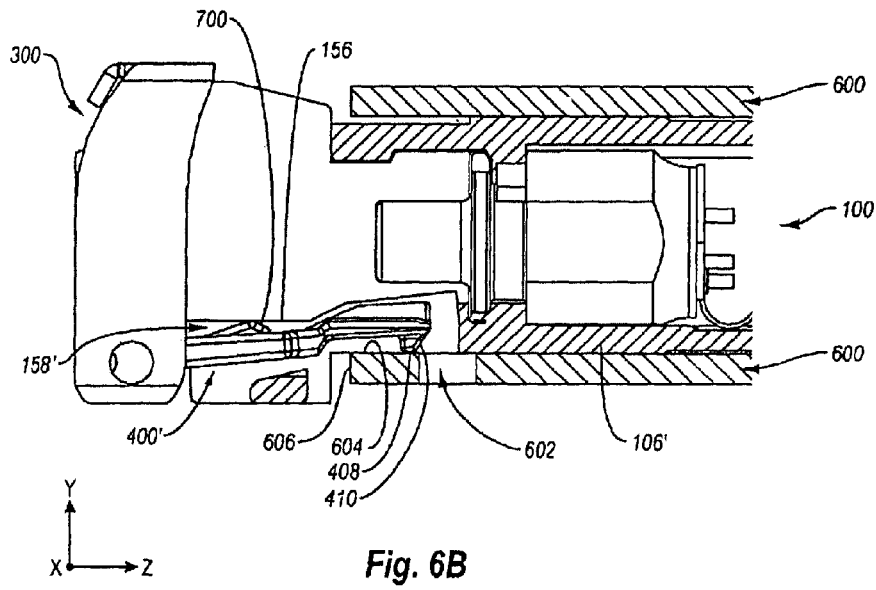

Reference is now made to FIGS. 6A and 6B, which disclose various aspects regarding a module 100' that includes another example latching mechanism 200'. As disclosed in FIG. 6A, the example latching mechanism 200' includes a cantilever spring 700 attached to a latch 400'. The spring 700 includes a base 702 having a hole 704. The base 702 is secured within a depression 414 formed in the latch 400' such that a post 416 of the latch 400' extends through the hole 704. Swaging of the post 416, use of an adhesive, or clipping the spring 700 in the latch 400', for example, can be used to secure the base 702 in the depression 414 in the latch 400'. Thus secured, a cantilever 706 of the spring 700 extends upward beyond the depression 414 of the latch 400'.

As disclosed in FIG. 6B, the spring 700 is configured to make contact with an inside surface 156 of the cavity 146' defined in a bottom shell 106' at least when the latch pin 408 is raised up to the level of the floor 604 of the receptacle 600. The spring 700 may additionally be configured to make contact with the inside surface 156 when the latch pin 408 is engaged in the recess 602 of the receptacle 600. A spring force exerted by the spring 700 against the inside surface 156 urges the latch pin 408 of the latch 400' downward so that when the latch pin 408 moves forward into position above the recess 602 of the receptacle 600, the latch pin 408 is biased into the recess 602. However, the spring 700 does not prevent the pin 408 from retracting into the bottom shell 106' when an upward force is exerted against the latch pin 408, such as by the floor 604 of the receptacle 600. Then, when that upward force is removed, the spring 700 is automatically extended against the inside surface 156 of the bottom shell 106', such as when the module 100' is inserted to the point where the pin 408 can extend through the recess 602.

For example, as disclosed in FIG. 6B, when the bail 300 is positioned in the latched position, the module 100' can subsequently be inserted into a receptacle 600 having a substantially rigid leading edge 606, since the latch pin 408 can travel upward in response to an upward force exerted by the floor 604 of the receptacle 600 on the latch pin 408. As disclosed elsewhere herein, the latch pin 408 may define a wedge surface 410. When the bail 300 is positioned in the latched position, the wedge surface 410 is configured to make contact with the substantially rigid leading edge 606 of the receptacle 600 during the insertion of the module 100' into the receptacle 600. The wedge surface 410 may enable the latch pin 408 to be smoothly pushed into the bottom shell 106'. So configured, the module 100' can be inserted into the receptacle 600 with the bail 300 in the latched position because the latch pin 408 can momentarily retract into the bottom shell 106', while initially passing into the receptacle 600, and then re-emerge from the bottom shell 106' once the latch pin 408 moves forward to the recess 602. In one example embodiment, the substantially rigid leading edge 606 of the receptacle 600 can help decrease the emission of electromagnetic radiation from within the receptacle 600, thereby decreasing the occurrence of electromagnetic interference in nearby electronic devices.

Thus, the example latching mechanism 200' can be used to selectively secure the module 100' within the receptacle 600 of a host device (not shown). In addition to the aspects discussed above in connection with the latching mechanism 200, the example latching mechanism 200' is configured so as to retract its latch pin 408 while still in the latched position so as to prevent malfunction when the module 100' is inserted into a receptacle with a substantially rigid leading edge.

What is claimed is:

1. A latching mechanism comprising:
   a bail configured to be attached to a shell of a module, the bail configured to rotate about a first axis between a latched position and an unlatched position, the first axis being in a fixed position relative to the shell; and
   a latch attached to the bail at a second axis that is offset from the first axis, the latch configured to rotate about the second axis, the second axis being movable relative to the shell.

2. The latching mechanism as recited in claim 1, wherein the latch includes a pin configured to releasably engage a corresponding structure of a host device when the bail is in the latched position, the pin further being configured to disengage from the corresponding structure when the bail is rotated from the latched position to the unlatched position.

3. The latching mechanism as recited in claim 1, wherein the bail defines a protrusion configured and arranged to releasably engage a recess defined in the shell.

4. The latching mechanism as recited in claim 1, wherein the bail defines a recess configured and arranged to releasably engage a protrusion defined in the shell.

5. A module comprising:
   a shell including a cross bar;
   a PCB at least partially positioned within the shell;
   a TOSA electrically coupled to the PCB;
   a ROSA electrically coupled to the PCB; and
   a latching mechanism comprising:
      a bail attached to the shell, the bail configured to rotate about a first axis between a latched position and an unlatched position, the first axis being in a fixed position relative to the shell; and
      a latch attached to the bail at a second axis that is offset from the first axis, the latch configured to rotate about the second axis, the second axis being movable relative to the shell.

6. The module as recited in claim 5, wherein the latch includes a pin configured to engage a corresponding structure of a host device when the bail is in the latched position, the pin further being configured to disengage from the corresponding structure when the bail is rotated from the latched position to the unlatched position.

7. The module as recited in claim 5, wherein the bail includes a visible indicator that provides information concerning a characteristic of the module.

8. The module as recited in claim 7, wherein the visible indicator comprises at least one of a color or one or more characters.

9. The module as recited in claim 7, wherein the characteristic of the module includes one of data rate, wavelength, communication protocol, form factor, manufacturer, or vendor of the module.

10. The module as recited in claim 5, wherein the latching mechanism includes a pair of visible indicators that each provide information concerning a data direction of a corresponding optical port of the module.

11. The module as recited in claim 5, wherein the bail defines a protrusion configured to engage a corresponding recess of the shell when the bail is in the latched position, such that the bail is releasably secured in the latched position.

12. The module as recited in claim 5, wherein the latch further includes a knuckle configured to push against a leading edge of a receptacle of a host device when the second axis is rotated about the first axis as the bail is rotated from the latched position to the unlatched position.

13. The module as recited in claim 5, wherein the latch is further configured to slide against and rotate about the cross bar, as the bail is rotated from the latched position to the unlatched position, such that the pin is retracted within the shell.

14. The module as recited in claim 13, wherein a portion of the latch is further configured to slide in a positive z-direction against the cross bar when the bail is rotated from the latched position to the unlatched position.

15. The module as recited in claim 5, wherein the module is substantially compliant with the SFP+ (IPF) MSA.

16. A module comprising:
   a shell including a cross bar;
   a PCB at least partially positioned within the shell;
   a TOSA electrically coupled to the PCB;
   a ROSA electrically coupled to the PCB; and
   a latching mechanism comprising:
      a bail attached to the shell, the bail configured to rotate about a first axis between a latched position and an unlatched position, the first axis being in a fixed position relative to the shell;
      a latch attached to the bail at a second axis that is offset from the first axis, the latch configured to rotate about the second axis, the second axis being movable relative to the shell; and
      a spring attached to the latch, the spring configured to engage a corresponding surface of the shell such that a pin of the latch is biased to extend from the shell when the bail is in the latched position, the spring also configured to allow the pin to be resiliently retained within the shell when the bail is in the latched position.

17. The module as recited in claim 16, wherein the pin is configured to engage a corresponding structure of a host device when the bail is in the latched position, the pin further being configured to disengage from the corresponding structure when the bail is rotated from the latched position to the unlatched position.

18. The module as recited in claim 16, wherein the latching mechanism includes a visible indicator that provides information concerning a characteristic of the module.

19. The module as recited in claim 16, wherein the bail defines a protrusion configured to engage a recess defined in the shell when the bail is in the latched position, such that the bail is releasably secured in the latched position.

20. The module as recited in claim 16, wherein the latch further includes a knuckle configured to push against a leading edge of the receptacle of the host device into which the module is positioned as the bail is rotated from the latched position to the unlatched position.

* * * * *

UNITED STATES PATENT AND TRADEMARK OFFICE
CERTIFICATE OF CORRECTION

PATENT NO. : 7,351,090 B1  Page 1 of 3
APPLICATION NO. : 11/830674
DATED : April 1, 2008
INVENTOR(S) : Moore It is certified that error appears in the above-identified patent and that said Letters Patent is hereby corrected as shown below:

Drawings
Sheet 7, replace FIG. 4C with the figure depicted below, wherein the cavity 146 has been relabeled 158.

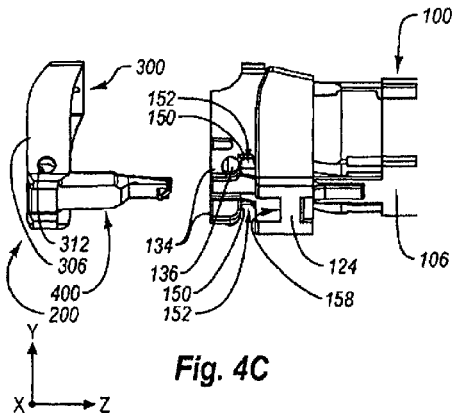

Fig. 4C

Sheet 8, replace FIG. 5A with the figure depicted below, wherein the cavity 146 has been relabeled 158.

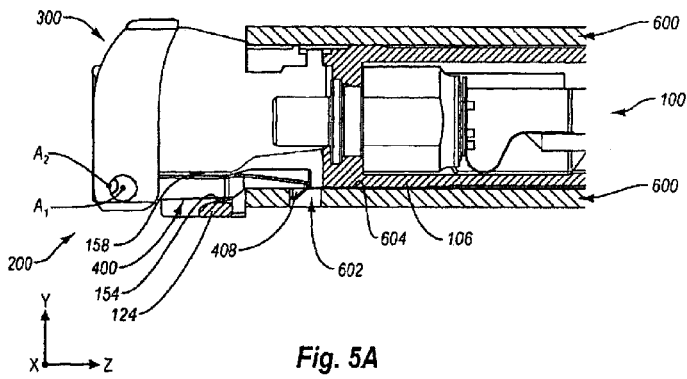

Fig. 5A

Signed and Sealed this

Ninth Day of November, 2010

David J. Kappos
*Director of the United States Patent and Trademark Office*

Sheet 8, replace FIG. 5B with the figure depicted below, wherein the cavity 146 has been relabeled 158.

Sheet 9, replace FIG. 6B with the figure depicted below, wherein the cavity 146 has been relabeled 158 and the module 100 is relabeled 100'.

CERTIFICATE OF CORRECTION (continued)
U.S. Pat. No. 7,351,090 B1

Column 7
Line 6, change "latch 400" to --latch 400'--
Line 46, change "cavity 146" to --cavity 158--
Line 48, change "cavity 146" to --cavity 158--
Line 49, change "cavity 146" to --cavity 158--
Line 52, change "cavity 146" to --cavity 158--

Column 8
Line 49, change "cavity 146" to --cavity 158--
Line 51, change "cavity 146" to --cavity 158--
Line 59, change "disclosed in FIG. 5B" to --disclosed in FIGS. 5B, 4C, and 1C--

Column 9
Line 32, change "cavity 146'" to --cavity 158'--

Column 10
Line 12, change "200; the example" to --200 (see FIGS. 5A and 5B); the example--